(12) United States Patent
Suk

(10) Patent No.: US 7,535,161 B2
(45) Date of Patent: May 19, 2009

(54) FLAT FLUORESCENT LAMP AND DISPLAY DEVICE HAVING THE SAME

(75) Inventor: Bong-Kyung Suk, Suwon-si (KR)

(73) Assignee: Samsung Mobile Display Co., Ltd., Suwon (KR)

( * ) Notice: Subject to any disclaimer, the term of this patent is extended or adjusted under 35 U.S.C. 154(b) by 243 days.

(21) Appl. No.: 11/225,069

(22) Filed: Sep. 14, 2005

(65) Prior Publication Data

US 2006/0076873 A1 Apr. 13, 2006

(30) Foreign Application Priority Data

Oct. 7, 2004 (KR) ................. 10-2004-0079840

(51) Int. Cl.
*H01J 1/62* (2006.01)
*H01J 63/04* (2006.01)

(52) U.S. Cl. ............... 313/492; 313/484; 313/485; 313/491; 313/493; 313/613; 313/626

(58) Field of Classification Search ............ 313/484, 313/485, 491, 492, 493, 613, 626
See application file for complete search history.

(56) References Cited

U.S. PATENT DOCUMENTS

| 5,343,115 | A | * | 8/1994 | Anandan et al. | 313/491 |
| 5,343,116 | A | * | 8/1994 | Winsor | 313/493 |
| 6,075,320 | A | * | 6/2000 | Winsor | 315/94 |
| 6,787,981 | B2 | * | 9/2004 | Yoo et al. | 313/491 |
| 2005/0062398 | A1 | * | 3/2005 | Yoshida et al. | 313/486 |
| 2006/0017392 | A1 | * | 1/2006 | Park et al. | 315/169.1 |

FOREIGN PATENT DOCUMENTS

| JP | 09027298 | 1/1997 |
| JP | 2006073494 | 3/2006 |
| KR | 10-2000-0049776 | 8/2000 |
| KR | 10-2000-0054154 | 9/2000 |
| KR | 1020020068123 | 8/2002 |
| KR | 1020020069292 | 8/2002 |
| KR | 10-2003-0032559 | 4/2003 |
| KR | 10-2005-0036272 | 4/2005 |

* cited by examiner

*Primary Examiner*—Nimeshkumar D. Patel
*Assistant Examiner*—Thomas A Hollweg
(74) *Attorney, Agent, or Firm*—H.C. Park & Associates, PLC

(57) ABSTRACT

An improved flat fluorescent lamp and a display device having the same are disclosed, by which a luminance can be improved and a driving voltage can be reduced. The flat fluorescent lamp may include: a lower substrate; an upper substrate combined with the lower substrate to provide a discharge area; a plurality of walls partitioning the discharge area to provide a plurality of discharge units; first and second voltage-applying electrodes disposed at opposite ends of each discharge unit, the first and second voltage-applying electrodes being exposed; first and second discharge electrodes formed on the first and second voltage-applying electrodes, respectively; a dielectric layer coated on the first and second voltage-applying electrodes; and a fluorescent layer formed on the discharge area.

19 Claims, 7 Drawing Sheets

FLAT FLUORESCENT LAMP AND DISPLAY DEVICE HAVING THE SAME

CROSS-REFERENCE TO RELATED APPLICATIONS

This application claims priority to and the benefit of Korean Patent Application No. 10-2004-0079840 filed on Oct. 7, 2004 in the Korean Intellectual Property Office, the content of which is incorporated by reference as if fully set forth herein.

BACKGROUND OF THE INVENTION

1. Field of the Invention

The present invention relates to a display device generally, and more particularly, to a flat fluorescent lamp and a display device having the same, by which a luminance can be improved and a driving voltage can be reduced.

2. Description of the Related Art

Recent developments in semiconductor technology permit the manufacture of display devices having smaller size, lighter weight, and better performance than predecessor cathode ray tube (CRT) display devices, but the need for improved and more reliable illumination sources has increased accordingly.

Among various kinds of flat display devices, a liquid crystal display (hereinafter referred to as an "LCD") is highlighted as a next-generation display device capable of overcoming shortcomings of a conventional cathode ray tube (CRT) display because the LCD can be manufactured smaller, lighter, and with lower power consumption than a CRT display. For these reasons, today, most data processing devices employ an LCD device.

In a typical LCD device, molecular orientations of liquid crystal cells are changed by a voltage applied thereto. Such changes of the molecular orientations result in changes of optical properties, such as birefringence, optical rotation, dichroism, and light scattering in luminescent liquid crystal cells, and thereby, the light transmitting the liquid crystal cell is modulated so that a desired image data can be visually perceived by a user.

Since the LCD panel is a non-emissive element, a typical LCD device includes a light source such as a backlight unit for supplying the light from the bottom of the liquid crystal panel. A large-sized LCD device such as a digital TV usually employs a plurality of lamps as the backlight unit. As a result, a plurality of parts and components need to be provided and assembled together, thereby complicating the manufacturing process. Furthermore, the thickness of the backlight unit may be increased to prevent breakage of the lamps due to external impacts. However, this added protection tends to increase the overall thickness of the LCD device itself.

In order to solve such problems, flat fluorescent lamps have been developed. In such lamps, fluorescent gases are injected into the inside of the lamp and discharged to emit light. A drawback of fluorescent lamps is that if electrodes are provided in the outside surface of a glass substrate, a thick glass substrate of about 0.7 mm to about 2.0 mm needs to be used as a dielectric layer. This range of thickness produces a large voltage drop in the glass substrate. To compensate this, a high voltage must be supplied to the flat fluorescent lamp. Nevertheless, a desired luminance cannot be guaranteed.

In an attempt to solve such problems, another type of flat fluorescent lamp has been developed. In the second type of flat fluorescent lamp, electrodes are provided in the inside surface(s) of the glass substrate, and dielectric layers are formed on the electrodes. This configuration permits the flat fluorescent lamp to be discharged using a reduced discharge voltage. However, due to the discharge characteristics of this type of flat fluorescent lamp, its luminance remains less than satisfactory.

A solution is needed that provides an improved flat fluorescent lamp having improved luminance and reduced driving voltage, as well as an LCD incorporating the same.

SUMMARY OF THE INVENTION

A flat fluorescent lamp (and LCD incorporating the same) manufactured according to the principles of the present invention may solve at least the aforementioned problems, by providing an improved luminance and a reduced driving voltage.

A flat fluorescent lamp manufactured according to the principles of the invention may include a lower substrate; an upper substrate combined with the lower substrate to provide a discharge area; a plurality of walls partitioning the discharge area to provide a plurality of discharge units; first and second voltage-applying electrodes disposed at opposite ends of each discharge unit, the first and second voltage-applying electrodes being exposed; first and second discharge electrodes formed on the first and second voltage-applying electrodes; and a fluorescent layer formed on the discharge area.

Such a flat fluorescent lamp may further include a frit layer interposed between the first discharge electrode and the first voltage-applying electrode as well as interposed between the second discharge electrode and the second voltage-applying electrode. Additionally, the upper surface area of the voltage-applying electrode may be larger than a surface area of the discharge electrode.

Other features may be included in the flat fluorescent lamp. For example, the first discharge electrode and the second discharge electrode may each include cavity. At least one of the first discharge electrode and the second discharge electrode may have either a rectangular shape or a cylindrical shape. Moreover, at least one of the first voltage-applying electrode and second voltage-applying electrode may be partitioned by one or more walls and the partitioned portions may be separated from one another.

A flat fluorescent lamp (an LCD incorporating the same) manufactured according to the principles of the invention, may include a plurality of discharge units, each discharge unit including a first discharge electrode formed proximate to a corresponding first voltage-applying electrode, and a second discharge electrode formed proximate to a corresponding second voltage-applying electrode. Moreover, each of the first and second voltage-applying electrodes may be formed in a single body across the walls.

The first voltage-applying electrode and the second voltage-applying electrode may each be formed of a conductive material selected from a group that includes Ag, Al, Au, and Cu. The first discharge electrode and the second discharge electrode may each be formed of an alloy selected from a group that includes a Ni—Mo alloy, a Ni—Fe alloy, and a Ni—Fe—Cr alloy. The Ni—Fe alloy may comprise at least 42% of Ni, Fe, and impurities.

A flat fluorescent lamp (and LCD incorporating the same) manufactured according to the principles of the invention may further include a reflection layer formed on the lower substrate. The reflection layer may be formed of a material selected from a group that includes $Al_2O_3$, $TiO_2$, and $SiO_2$. Additionally, each wall may have a ventilation tunnel on its side surface.

Another aspect of the claimed invention may provide a display device having a panel unit and a backlight assembly that includes the aforementioned flat fluorescent lamp.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, embodiments of the present invention will be described in detail with reference to the accompanying drawings. Various embodiments of the present invention are described herein for illustrative purposes only, but the claimed invention is not limited thereto.

Figure 1:
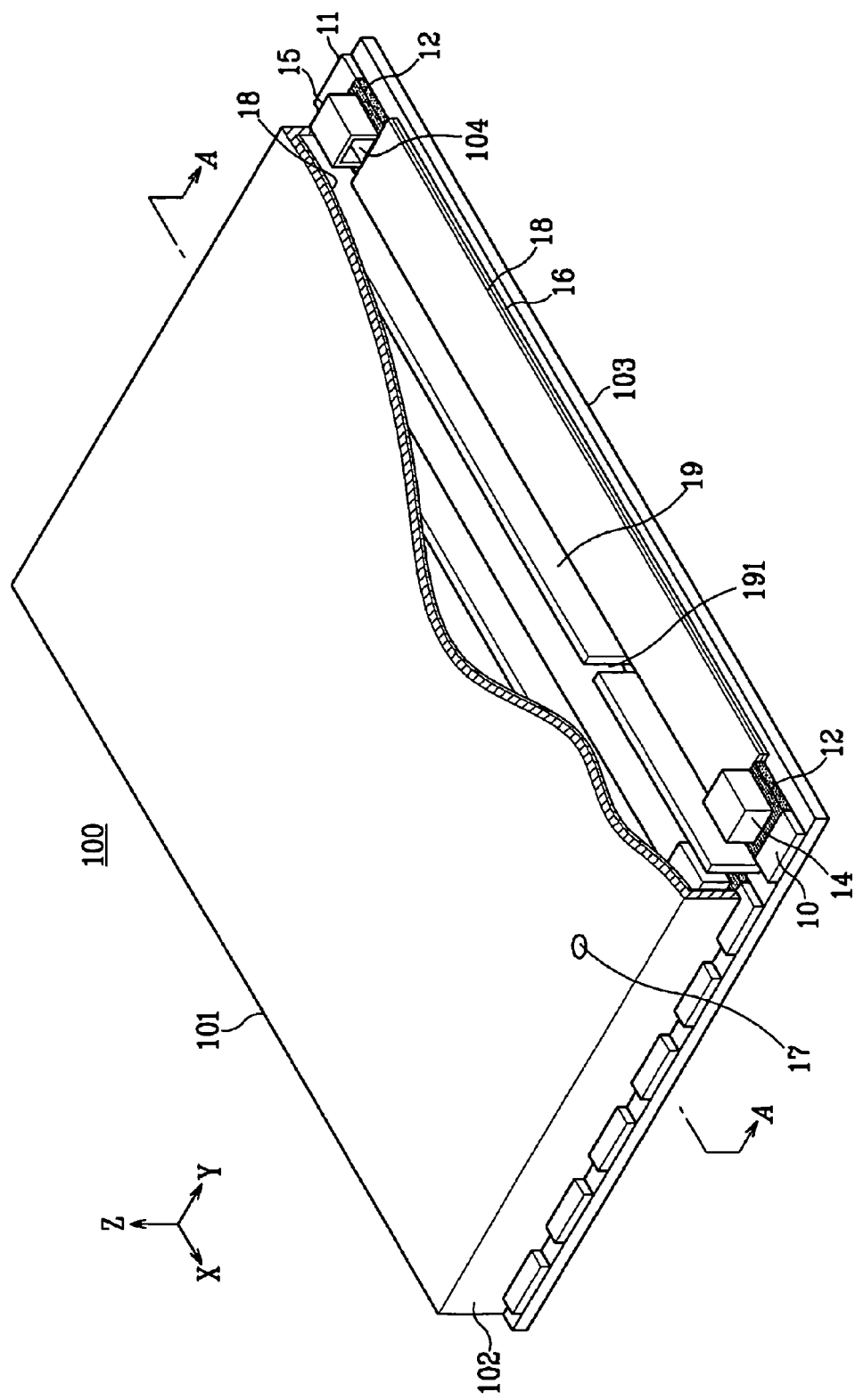
FIG. 1 is a perspective view illustrating a flat fluorescent lamp according to a first embodiment of the present invention.

FIG. 1 is a perspective view illustrating a flat fluorescent lamp 100 according to a first embodiment of the present invention, in which an upper substrate 101 is partially cut away to show the inside. The flat fluorescent lamp 100 structure shown in FIG. 1 is given only for an illustrative purpose, and is not intended to limit the claimed invention. Therefore, a flat fluorescent lamp 100 manufactured according to the principles illustrated by FIG. 1 may be embodied in various forms.

As shown in FIG. 1, the flat fluorescent lamp 100 includes a lower substrate 103 and an upper substrate 101 which is combined with the lower substrate 103 to provide a discharge area (i.e., all or part of a multi-dimensional area formed between an inner surface of the upper substrate 101 and an inner surface of the lower substrate 103). As shown, upper substrate 101 may include one or more integrally formed sidewalls 102. However, in other embodiments, the sidewalls 102 may be independently formed or formed as part of the lower substrate 103. As shown in the cutaway view of FIG. 1, the discharge area may be separated into a plurality of discharge units by one or more interior walls 19 provided on the lower substrate 103. As illustratively shown in FIG. 1, each discharge unit may have a rectangular shape; however other configurations are possible. Additionally, each wall 19 may have a ventilation tunnel 191 formed near the center of its side surface to regulate the pressures of the discharge gases in each discharge unit.

A first voltage-applying electrode 10 and a second voltage-applying electrode 11 are provided at opposite ends of each discharge unit and are partitioned by walls 19, so that a plurality of discharge units can be provided on the lower substrate 103 and independently driven. A discharge electrode 14 is formed proximate to the corresponding voltage applying electrode 10, and a discharge electrode 15 is formed proximate to the corresponding voltage applying electrode 11.

The first voltage-applying electrode 10 and the second voltage-applying electrode 11 may each include a portion thereof that is exposed outside the sidewall 102. These exposed portions receive from a power source (not shown) the voltages to be transmitted to the discharge electrodes 14 and 15, respectively. The first and second voltage-applying electrodes 10 and 11 may be made from a conductive material selected from a group of Ag, Al, Au, and Cu, and may be formed by sputtering or using pastes. Therefore, their manufacturing processes can be simple.

The first discharge electrode 14 receives voltages from the first voltage-applying electrode 10, and the second discharge electrode 15 receives voltages from the second voltage-applying electrode 11, to discharge electrons and generate light. The first and second discharge electrodes 14 and 15 may each be made from an alloy selected from a group of a Ni—Mo alloy, a Ni—Fe alloy, and Ni—Fe—Cr alloy, thereby yielding good durability. Preferably, the first and second discharge electrodes 14 and 15 are made from a Ni—Fe alloy composed of at least 42% Ni, Fe, and impurities. Manufacturing discharge electrodes 14 and 15 of these, or similar alloys, may increase plasma density, thereby improving luminance.

The sidewalls 102 and the lower substrate 103 may be combined with each other by interposing a frit 13 (shown in FIG. 2) therebetween.

The inside of the flat fluorescent lamp 100 may be ventilated using vent hole 17, which may be formed through the upper substrate 101. After ventilating the inside of the lamp through the vent hole 17, discharge gases (of which Ar and Xe are two examples) may be injected (through the vent hole 17 into the inside of the lamp. Thereafter, the vent hole 17 may be sealed to prevent the injected gases from escaping.

When the flat fluorescent lamp 100 is powered, electrons emitted from the discharge electrodes 14 and 15 excite the previously injected gas, which discharges to generate one or more ultraviolet rays. In turn, the generated ultraviolet rays excite the fluorescent layer 18 to generate visible light. In the fluorescent layer 18 formed in the discharge area, fluorescent materials capable of generating red, green, and blue colors when collided by the ultraviolet ray(s) are regularly distributed, so that white light is output. Furthermore, on the lower substrate 103, a reflection layer 16 may be provided under the fluorescent layer 18 to reflect the light from the fluorescent layer 18 toward the upper substrate 101. The reflection layer 16 may be made from a thick film paste having a material selected from a group that includes, but is not limited to, $Al_2O_3$, $TiO_2$, and $SiO_2$.

In order to prevent the first and second voltage-applying electrodes 10 and 11 from being damaged by arc discharge, a dielectric layer 12 may be coated on each of the first and second voltage-applying electrodes 10 and 11. As illustratively shown in FIG. 1, the dielectric layer 12 may be preferably coated on an entire interior upper surface of the first and second voltage-applying electrodes 10 and 11. Also, the dielectric layer 12 may be made from a dielectric paste having a relative permittivity of about 16 to about 20 and may have a thickness of in the range of about 20 μm to about 500 μm. Use of the dielectric layer 12 makes it possible to prevent the arc-discharge damage to the first and second voltage-applying electrodes 10 and 11.

In the flat fluorescent lamp 100, voltages can be effectively and uniformly applied to the discharge electrodes 14 and 15 because the upper surface areas of the voltage-applying electrodes 10 and 11 are larger than the corresponding lower surface areas of the discharge electrodes 14 and 15.

The first discharge electrode 14 and the second discharge electrode 15 may each be formed to include a cavity 104. Each cavity 104 may function as an electron discharge hole. Additionally, each cavity 104 may be arranged in an X-axis direction and positioned opposite the other (i.e., opening toward the center of the discharge area), so that electrons can be easily discharged from the holes and the discharge gas can be easily excited.

As illustratively shown in FIG. 1, at least one of the first and second discharge electrodes 14 and 15 has a rectangular shape. Although both the first and second discharge electrodes 14 and 15 are illustrated to have a rectangular shape in FIG. 1, the present invention is not limited thereto. Moreover, only one of the first and second discharge electrodes 14 or 15 may have a rectangular shape. The other may have the same or different shape.

Figure 2:
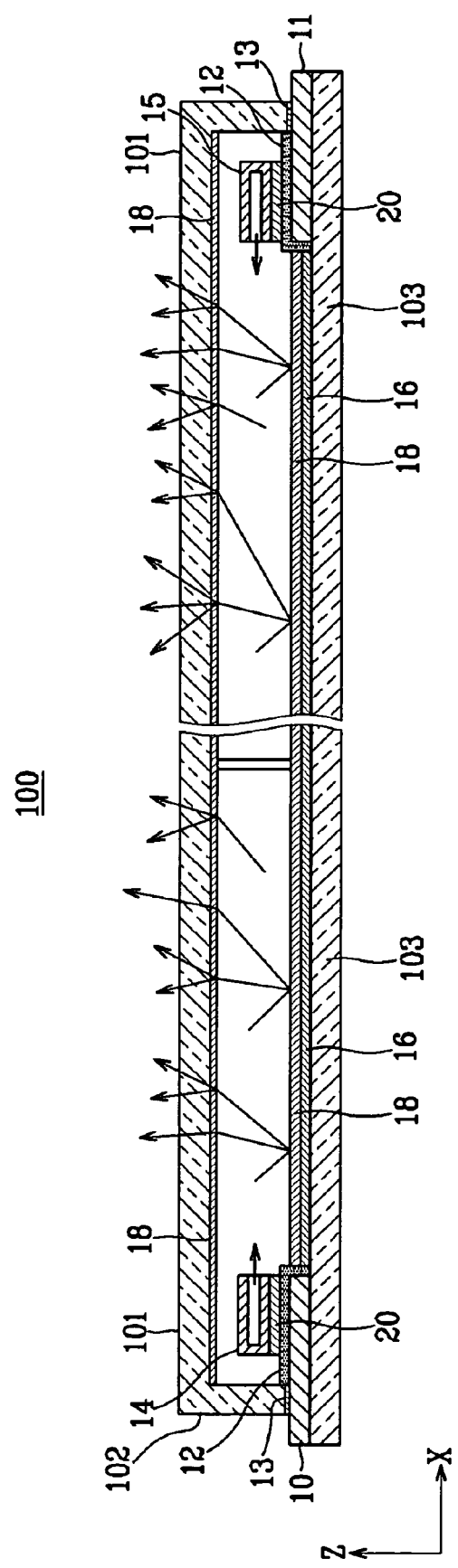
FIG. 2 is a cross-sectional view along an A-A line of FIG. 1.

FIG. 2 is a cross-sectional view along a line A-A shown in FIG. 1. In FIG. 2, a plurality of arrows indicates the discharge directions that may be taken by electrons excited within the flat fluorescent lamp 100.

Also, a frit layer 20 may be interposed between the first discharge electrode 14 and the first voltage-applying electrode 10 as well as between the second discharge electrode 15 and the second voltage-applying electrode 11 to facilitate an excellent electrical bonding between each discharge electrode and the voltage-applying electrode.

As mentioned with reference to FIG. 1, the sidewalls 102 (which may or may not be integrally formed with the upper substrate 101) may be combined with the lower substrate 103 by interposing a frit 13 therebetween. In this manner, a plurality of discharge units partitioned by the walls 19 may be created. In each discharge unit, electrons are discharged from the first and second discharge electrodes 14 and 15, each of which includes a cavity 104 (i.e., an electron hole) to generate one or more ultraviolet ray(s). The generated ultraviolet ray(s) excite the fluorescent layer 18 disposed on the inside surface of the upper substrate 101 and the lower substrate 103 to generate visible light. To minimize optical losses and improve luminance, a reflection layer 16 may be provided in each discharge unit (and positioned on the bottom substrate 103 below the fluorescent layer 18) to reflect the generated visible light toward the upper substrate 101.

Various other exemplary embodiments of the claimed invention are described below with reference to FIG. 3, FIG. 4, FIG. 5, FIG. 6, and FIG. 7. Such embodiments are described for illustrative purposes only, and are not intended to limit the claimed invention.

Figure 3:
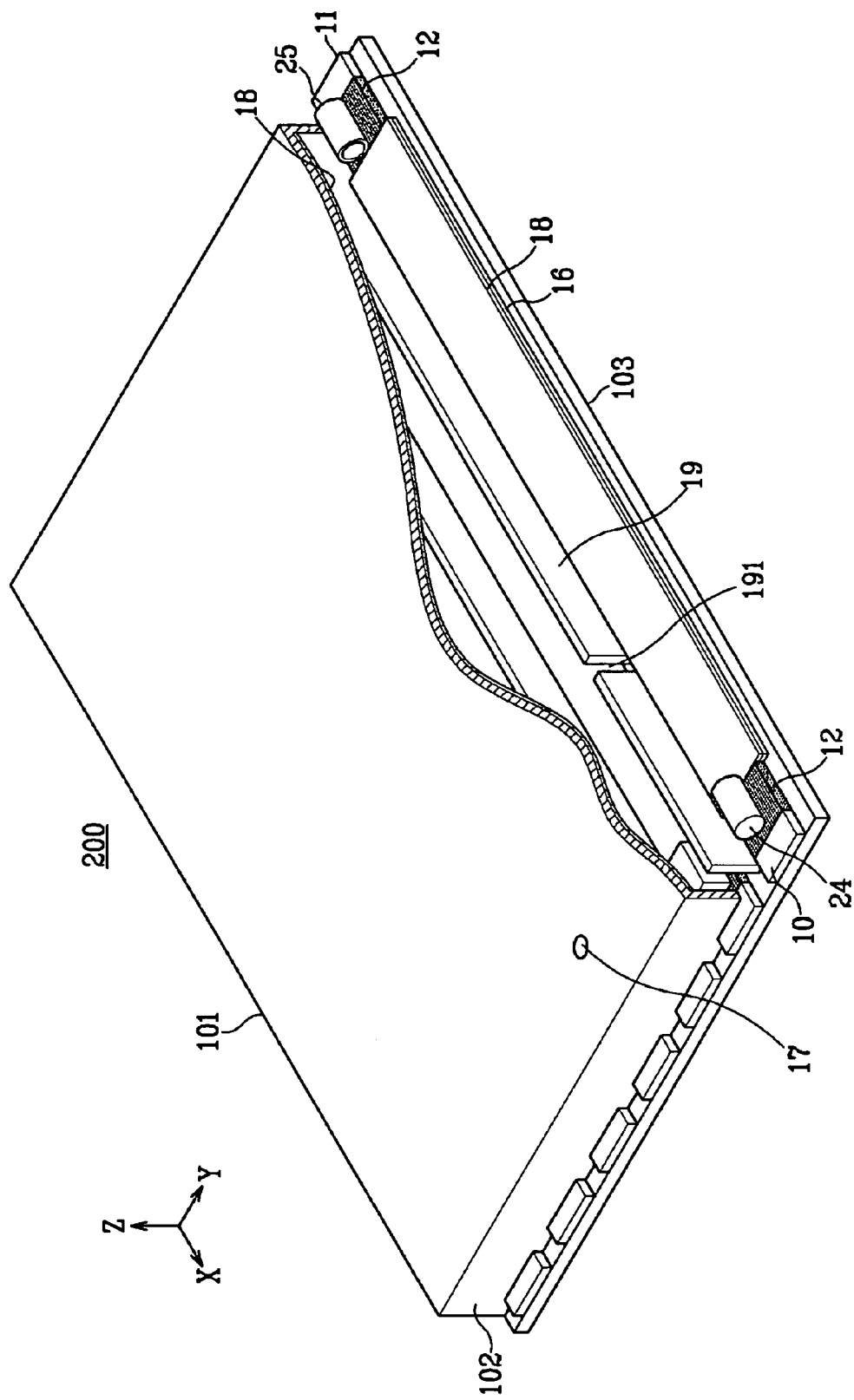
FIG. 3 is a perspective view illustrating a flat fluorescent lamp according to a second embodiment of the present invention.

FIG. 3 is a perspective view illustrating a flat fluorescent lamp 200 according to a second embodiment of the present invention, in which an upper substrate 101 is partially cut away to show the inside discharge area and at least one, of its discharge units. The flat fluorescent lamp 200 shown in FIG. 3 has a structure similar to that of the flat fluorescent lamp 100 shown in FIG. 1. Consequently, in FIG. 3, the reference numerals 10, 11, 12, 16, 17, 18, 19, 102, 103, 104, and 191 refer to the components previously described with respect to FIG. 1, the descriptions of which are not repeated here in order not to unnecessarily complicate the invention.

As shown in FIG. 3, at least one of the first and second discharge electrodes 24 and 25 may have a cylindrical shape, but the claimed invention is not limited thereto. In another configuration, only one of the first and second discharge electrodes 24 and 25 may have a cylindrical shape. The other may have the same or a different shape, such as a rectangular shape, for example. Forming a discharge electrode to have a cylindrical shape may facilitate and simplify a process for manufacturing the inside cavity (e.g., electron hole) of the discharge electrode.

Figure 4:
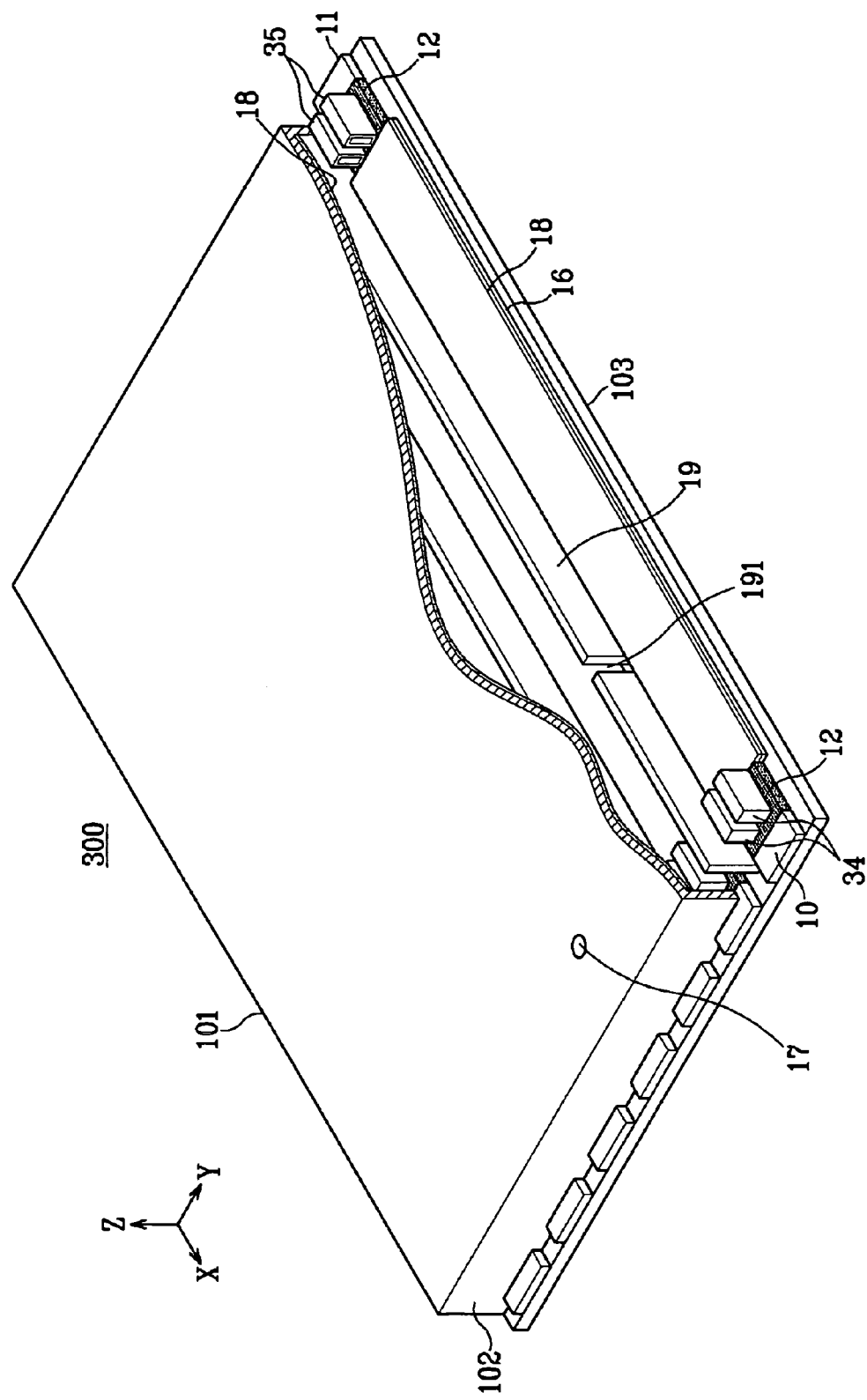
FIG. 4 is a perspective view illustrating a flat fluorescent lamp according to a third embodiment of the present invention.

FIG. 4 is a perspective view illustrating a flat fluorescent lamp 300 according to a third embodiment of the present invention, in which an upper substrate 101 is partially cut away to show the inside discharge area and at least one of its discharge units. The flat fluorescent lamp 300 shown in FIG. 4 has a structure similar to that of the flat fluorescent lamp 100 shown in FIG. 1. Consequently, in FIG. 4, the reference numerals 10, 11, 12, 16, 17, 18, 19, 102, 103, 104, and 191 refer to the components previously described with respect to FIG. 1, the descriptions of which are not repeated here in order not to unnecessarily complicate the invention.

As shown in FIG. 4, a first plurality of discharge electrodes 34 may be provided on the first voltage-applying electrodes 10, and a second plurality of discharge electrodes 35 may be provided on the second voltage-applying electrodes 11. Thus, as illustratively shown, two rectangular discharge electrodes 34 may be provided for the voltage-applying electrode 10, and two rectangular discharge electrodes 35 may be provided for the voltage-applying electrode 11, but the claimed invention is not limited thereto. In other configurations of the claimed invention, the shape or the number of the discharge electrodes 34 and 35 may be changed.

Figure 5:
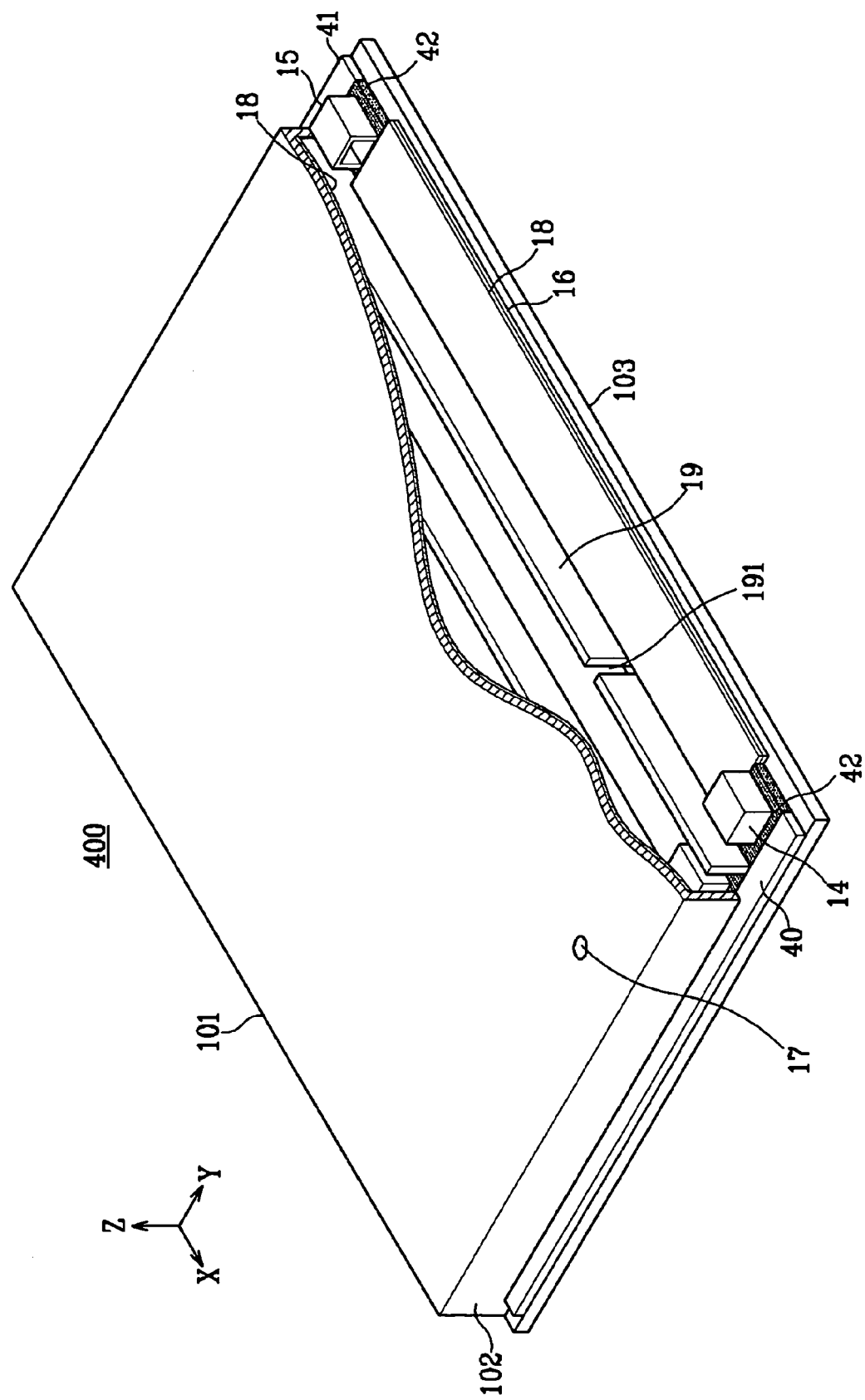
FIG. 5 is a perspective view illustrating a flat fluorescent lamp according to a fourth embodiment of the present invention.

FIG. 5 is a perspective view illustrating a flat fluorescent lamp 400 according to a fourth embodiment of the present invention, in which an upper substrate 101 is partially cut away to show the inside discharge area and at least one of its discharge units. The flat fluorescent lamp 400 shown in FIG. 5 has a structure similar to that of the flat fluorescent lamp 100 shown in FIG. 1. Consequently, in FIG. 5, the reference numerals 10, 11, 16, 17, 18, 19, 102, 103, 104, and 191 refer to the components previously described with respect to FIG. 1, the descriptions of which are not repeated here in order not to unnecessarily complicate the invention.

As shown in FIG. 5, the first voltage-applying electrode 40 and the second voltage-applying electrode 41 are each formed in a single body. The non-segmented first voltage-applying electrode 40 extends across one end of the walls 19; the non-segmented second voltage-applying electrode 41 extends across the opposite end of the walls 19. As illustratively shown in FIG. 5, each of the first and second voltage-applying electrodes 40 and 41 is formed in a single body having a longitudinal axis parallel to the Y-axis.

Forming each of the first and second voltage-applying electrodes 40 and 41 to have a non-segmented body, may advantageously permit easy connection to external power sources and may also provide improved discharge efficiency. A dielectric layer 42 may be coated on an interior portion of each of the first and second voltage-applying electrodes 40 and 41 in a single body to protect the first and second voltage-applying electrodes 40 and 41 from being damaged by arc-discharge during use.

Figure 6:
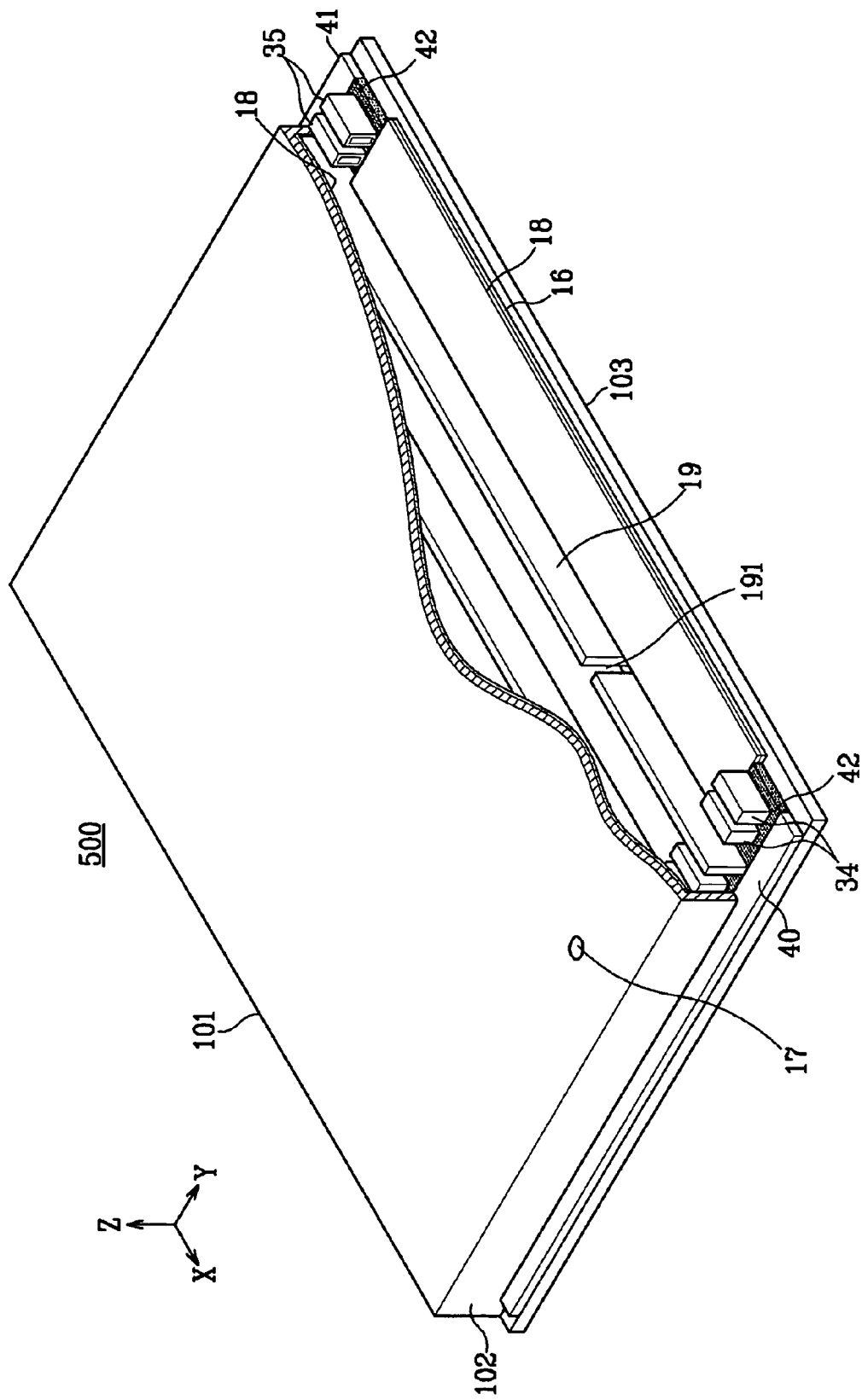
FIG. 6 is a perspective view illustrating a flat fluorescent lamp according to a fifth embodiment of the present invention.

FIG. 6 is a perspective view illustrating a flat fluorescent lamp 500 according to a fifth embodiment of the present invention, in which an upper substrate 101 is partially cut away to show the inside discharge area and at least one of its discharge units. The flat fluorescent lamp 500 shown in FIG. 6 has a structure similar to that of the flat fluorescent lamp 100 shown in FIG. 1. Consequently, in FIG. 6, the reference numerals 10, 11, 16, 17, 18, 19, 102, 103, 104, and 191 refer to the components previously described with respect to FIG. 1, the descriptions of which are not repeated here in order not to unnecessarily complicate the invention.

As illustratively shown in FIG. 6, when the first voltage-applying electrode 40 and the second voltage-applying electrode 41 are each formed in a single body, a first plurality of discharge electrodes 34 may be provided at one end of each discharge unit; and a second plurality of discharge electrodes 35 may be provided at the opposite end of each discharge unit. In FIG. 6, two rectangular discharge electrodes 34 are provided at one end of each discharge unit; and two rectangular discharge electrodes 35 are provided at the opposite end of each discharge unit. However, the present invention is not limited to this exemplary configuration. In other embodiments, the shape or the number of the discharge electrodes may be changed.

An advantage of the exemplary configuration illustrated in FIG. 6 is that the number of secondary electrons discharged may be significantly increased by providing a plurality of discharge electrodes 34 and 35 per each discharge unit. In turn, the increased flow of secondary electrons may increase plasma discharge density and improve discharge efficiency.

Figure 7:
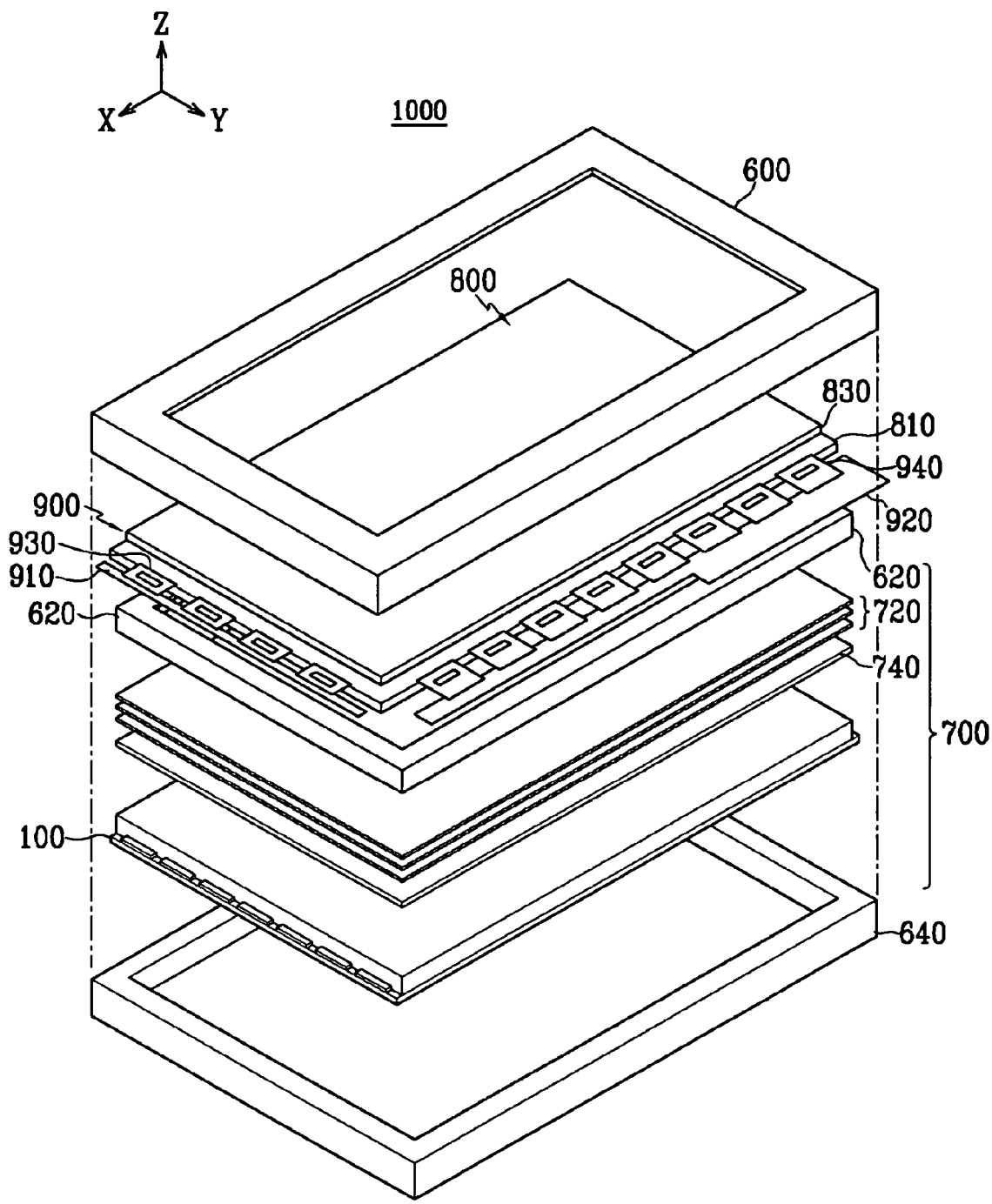
FIG. 7 is an exploded perspective view illustrating a liquid crystal display device having a flat fluorescent lamp according to a first embodiment of the present invention.

FIG. 7 is an exploded perspective view illustrating a direct type display device 1000 having a flat fluorescent lamp 100 according to a first embodiment of the present invention. The structure shown in FIG. 7 is illustrative only, and is not intended to limit the claimed invention. Other configurations of the direct type display device 1000 are possible. For example, the flat fluorescent lamp 100 shown in FIG. 7 may be replaced with any of the flat fluorescent lamps 200, 300, 400, and 500 that are illustratively depicted in FIG. 3, FIG. 4, FIG. 5 or FIG. 6.

As illustratively shown in FIG. 7, the display device 1000 may include a backlight assembly 700 for supplying light and a panel unit 800 for displaying images using the generated light. The panel unit assembly includes a panel unit 800, driver integrated circuit (IC) packages 930 and 940, and printed circuit boards (PCBs) 910 and 920. The driver IC packages 930 and 940 can be a TOP (tape carrier package) or a COF (chip on film). The panel unit 800 is fixed on the backlight assembly 700 by the top chassis 600.

Although the panel unit 800 is drawn as an LCD panel in FIG. 7, this is merely to illustrate the present invention and the present invention is not limited thereto.

The backlight assembly 700 shown in FIG. 7 may be used to supply and guide light to the panel unit assembly 900; the panel unit assembly 900 controls the panel unit 800 displaying images.

The panel unit 800 may include a thin film transistor (TFT) panel 810 having a plurality of thin film transistors, a color filter panel 830 disposed on the TFT panel 810, and a liquid crystal layer interposed therebetween.

The TFT panel 810 may be a transparent glass panel having thin film transistors formed in a matrix shape, and has a source terminal connected to a data line and a gate terminal connected to a gate line. In addition, a pixel electrode may be formed on the drain terminal. The pixel electrode may be made from a transparent conductive indium tin oxide (ITO) film.

The gate line and the data line of the panel unit 800 may be connected to the PCBs 910 and 920. When an electrical signal is input from the PCBs 910 and 920, the electrical signal flows to the source terminal and the gate terminal of the TFT, and the TFT is turned on or off according to the electrical signal so that the electrical signals used to form the pixels are output to the drain terminal. The driver IC packages 930 and 940 may be connected to the PCBs 910 and 920, respectively to receive image signals therefrom, which it then transforms and applies as driving signals to the data line and the gate line of the panel unit 800.

The driver IC packages 930 and 940 generate a gate drive signal and data drive signal, respectively, for driving a panel unit, as well as a plurality of timing signal for allowing the data drive signal and the gate drive signal to be applied at appropriate times. The gate drive signal may be applied to the gate line, and the data drive signal may be applied to the data line of the panel unit 800.

A color filter panel 830 may be provided on the TFT panel 810. On the color filter panel 830, red, green, and blue (RGB) pixels may be formed by a thin-film process. When the light passes through the color filter panel 830, the pixels produces red, green, and blue colors. In addition, a common electrode made from an ITO may be coated on the entire surface of the color filter panel 830. When a power voltage is applied to the gate and source terminals of the TFT to turn on the TFT, an electric field is generated between the pixel electrode and the common electrode of the color filter panel. The electric field may change orientation angles of the liquid crystals interposed between the TFT panel 810 and the color filter panel 830, and change light transmittances accordingly, so that desired colors of the pixels can be obtained.

Under the panel unit assembly 900, a backlight assembly 700 may be disposed to provide uniform light to the panel unit 800. The backlight assembly 700 may include a flat fluorescent lamp 100 fixed in the bottom chassis 640 for supplying the panel unit 800 with light, a diffusion plate 740 for diffusing the light output from the flat fluorescent lamp 100, and optical sheets 720 for preserving the luminance of the light output from the flat fluorescent lamp 100 to provide the panel unit 800 with the light.

An inverter (not shown) and a control board (not shown) may be provided on the rear side of the bottom chassis 640. The inverter supplies the flat fluorescent lamp 100 with a power voltage and the control board connected to the data PCB 920 converts analog data signals into digital data signals to transmit them to the panel unit 800.

It is noted that the display device 1000 having the flat fluorescent lamp 100 does not require a plurality of lamps for a backlight assembly. Therefore, it is possible to reduce the number of the elements and simplify the manufacturing process.

As described above, the flat fluorescent lamp according to the present invention includes the first and second voltage-applying electrodes disposed at opposite ends of each discharge unit and exposed to the outside. Additionally, first and second discharge electrodes are provided proximate to the corresponding first and second voltage-applying electrodes. Such a configuration makes it possible to provide excellent discharge efficiency of the secondary electrons, improve a luminance and uniformity of the luminance, and decrease a driving voltage.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A flat fluorescent lamp comprising:
 a lower substrate;
 an upper substrate combined with the lower substrate to provide a discharge area therebetween;

a plurality of sidewalls extending between the lower substrate and the edges of the upper substrate to define an interior;
a plurality of walls partitioning the discharge area to provide a plurality of discharge units;
a first voltage-applying electrode disposed at one end of each discharge unit and having a portion extending outside a first sidewall to be outside of the interior;
a second voltage-applying electrode disposed at an opposite end of each discharge unit and having a portion extending outside a second sidewall opposite the first sidewall to be outside of the interior;
a first discharge electrode formed on the first voltage-applying electrode;
a second discharge electrode formed on the second voltage-applying electrode;
a dielectric layer coated on an interior portion of each of the first and second voltage-applying electrodes, each dielectric layer being arranged completely in the interior; and
a fluorescent layer formed within the discharge area.

2. The flat fluorescent lamp of claim 1, further comprising a frit layer interposed between the first discharge electrode and the first voltage-applying electrode as well as interposed between the second discharge electrode and the second voltage-applying electrode, wherein an upper surface area of each voltage-applying electrode is larger than a lower surface area of each discharge electrode.

3. The flat fluorescent lamp of claim 1, wherein the first discharge electrode has a first cavity therein facing toward a center of the discharge area and wherein the second discharge electrode has a second cavity therein facing toward the center of the discharge area.

4. The flat fluorescent lamp of claim 1, wherein at least one of the first and second discharge electrodes has a rectangular shape.

5. The flat fluorescent lamp of claim 1, wherein at least one of the first and second discharge electrodes has a cylindrical shape.

6. The flat fluorescent lamp of claim 1, wherein at least one of the first and second voltage-applying electrodes is partitioned by the walls, and the partitioned portions are separated from one another.

7. The flat fluorescent lamp of claim 1, wherein a first discharge electrode is provided proximate the first voltage-applying electrode in each discharge unit, and wherein a second discharge electrode is provided proximate the second voltage-applying electrode in each discharge unit.

8. The flat fluorescent lamp of claim 1, wherein the first voltage-applying electrode is formed in a single body across an end of the walls, and wherein the second voltage-applying electrode is formed in a single body across and opposite end of the walls.

9. The flat fluorescent lamp of claim 1, wherein the first voltage-applying electrode and the second voltage-applying electrode are made from a conductive material selected from the group consisting of Ag, Al, Au, and Cu.

10. The flat fluorescent lamp of claim 1, wherein the first discharge electrode and the second discharge electrode are made from an alloy selected from the group consisting of a Ni—Mo alloy, a Ni—Fe alloy, and a Ni—Fe—Cr alloy.

11. The flat fluorescent lamp of claim 10, wherein the first discharge electrode and the second discharge electrode are each made from the Ni—Fe alloy, comprising at least 42% of Ni, Fe, and impurities.

12. The flat fluorescent lamp of claim 1, further comprising a reflection layer formed on the lower substrate, and wherein the reflection layer is made from a material selected from the group consisting of $Al_2O_3$, $TiO_2$, and $SiO_2$.

13. The flat fluorescent lamp of claim 1, wherein each of the walls has a ventilation tunnel on its side surface.

14. The flat fluorescent lamp of claim 1, wherein the first discharge electrode and the second discharge electrode are on the dielectric layer and the dielectric layer is on the voltage applying electrodes.

15. The flat fluorescent lamp of claim 1, further comprising a frit layer, wherein the first discharge electrode and the second discharge electrode are directly on the frit layer, the frit layer is directly on the dielectric layer, and the dielectric layer is directly on the first voltage-applying electrode and the second voltage-applying electrode.

16. The flat fluorescent lamp of claim 1, wherein the sidewalls are integrally formed with either the lower substrate or the upper substrate.

17. The flat fluorescent lamp of claim 1, wherein the first sidewall is on the first voltage-applying electrode and the second sidewall is on the second voltage-applying electrode.

18. A display device comprising:
a panel unit; and
a backlight assembly including a flat fluorescent lamp, wherein the flat fluorescent lamp comprises:
a lower substrate;
an upper substrate combined with the lower substrate to provide a discharge area therebetween;
a plurality of sidewalls extending between the lower substrate and the edges of the upper substrate to define an interior;
a plurality of walls partitioning the discharge area to provide a plurality of discharge units;
a first voltage-applying electrode disposed at one end of each discharge unit and having a portion extending outside a first sidewall to be outside of the interior;
a second voltage-applying electrode disposed at an opposite end of each discharge unit and having a portion extending outside a second sidewall opposite the first sidewall to be outside of the interior;
a first discharge electrode formed on the first voltage-applying electrode;
a second discharge electrode formed on the second voltage-applying electrode;
a dielectric layer coated on an interior portion of each of the first and second voltage-applying electrodes, each dielectric layer being arranged completely the interior; and
a fluorescent layer formed within the discharge area.

19. A display device of claim 18, wherein the panel unit is a liquid display panel.

* * * * *